United States Patent [19]

Hemming

[11] 4,167,827

[45] Sep. 18, 1979

[54] TELEPHONE SET WITH ROTARY DIAL

[75] Inventor: Raymond C. Hemming, London, Canada

[73] Assignee: Northern Telecom Limited, Montreal, Canada

[21] Appl. No.: 884,285

[22] Filed: Mar. 7, 1978

[51] Int. Cl.² ............................................. G09F 3/00
[52] U.S. Cl. ....................................................... 40/337
[58] Field of Search ............... 40/10 R, 336, 337, 338

[56] References Cited

U.S. PATENT DOCUMENTS

| | | | |
|---|---|---|---|
| 1,812,964 | 7/1931 | Lambaugh et al. | 40/337 |
| 1,963,439 | 6/1934 | Gutberlet | 40/337 |
| 2,129,876 | 9/1938 | Rumbold | 40/337 |
| 2,416,692 | 3/1947 | Hersey | 40/337 X |
| 3,193,625 | 7/1965 | Triplett | 40/337 X |
| 3,197,573 | 7/1965 | Anson | 179/90 A |

Primary Examiner—Louis G. Mancene
Assistant Examiner—Wenceslao J. Contreras
Attorney, Agent, or Firm—Sidney T. Jelly

[57] ABSTRACT

A rotary dial telephone set has the normally opaque disc-shaped member, which closes the aperture in the top housing through which the dial passes, replaced by a transparent member behind which is held an opaque insert having indicia thereon giving both dialling numbers and related service indications in association with the finger holes in the dial. The opaque insert is held in the transparent member by a backing member. The form of numerals, i.e. Roman, Arabic, Hebrew, can readily be provided without separate disc-shaped members and similarly the service information can easily be changed without having to prepare new disc-shaped members or alternatively having to stick labels thereon.

2 Claims, 3 Drawing Figures

TELEPHONE SET WITH ROTARY DIAL

This invention relates to a telephone set having a rotary dial, and in particular conventional domestic telephones and similar units.

Conventional telephone sets with rotary dials have a solid opaque plastic disc-like member which is between the dials and dial mechanism and fills an aperture in the housing. This disc-like member normally carries the letters and figures for dialling.

It is necessary to provide the disc-like member as the dial is assembled to the dial mechanism prior to assembly of the dial mechanism to the telephone set base prior to assembly of the top housing to the base.

However, with the dial assembled to the dial mechanism, there is the problem that an aperture in the housing must be provided which is large enough either for the dial to pass through from the inside, or the dial mechanism to pass through from the outside. It becomes necessary to close down this aperture to prevent ingress of dirt and foreign matter and also to prevent users from inserting items into the telephone interior.

It is possible to provide an aperture slightly larger than the dial and to position an annular member between the dial and dial mechanism which is a fairly close fit around the dial central member and also seals into the aperture. It has become general to make the disc-like member of a larger outer diameter, and also the aperture in the housing, so that there is room around the periphery of the member for the letter and numbers.

Different letter and number arrangements may be required for different users. Further, for example in hotels, graphic symbols may be desired. For international sales purposes, different forms of script may be necessary. Up till now this has been met by a variety of means, for example adhesive annular members for sticking on to the original member; clip on members which go over the original member in some way; and making and stocking a variety of different disc-like members having differing forms of information.

Stick-on members are not particularly attractive. They often soon get picked at by users, become dirty and are not readily replaceable. Clip-on members are usually cumbersome, liable to become detached and inconvenient.

The present invention provides a disc-like member which is transparent and is common to all the differing forms of information to be made available. Replaceable inserts are positioned behind the member and thus by a simple adaption a conventional rotary dial telephone set can be provided which always has the same type of disc-like member beneath the dial regardless of the actual requirement of the form of information required.

The invention will be readily understood by the following description in conjunction with the accompanying drawings, in which.

Figure 1:
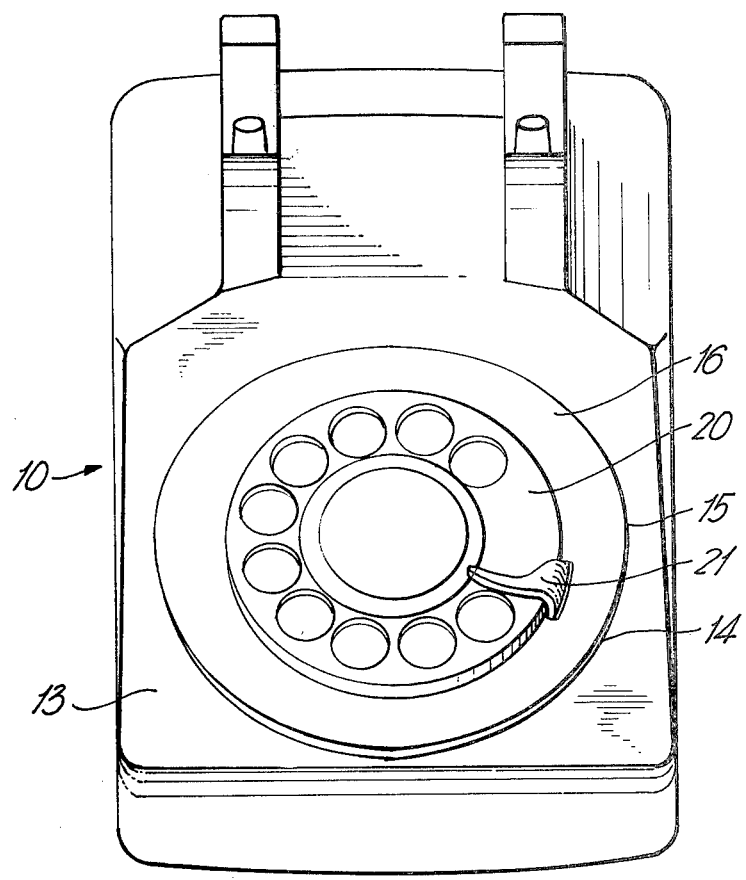
FIG. 1 is a front view on the forward surface, or dial surface of a telephone set, in accordance with the invention.
Figure 2:
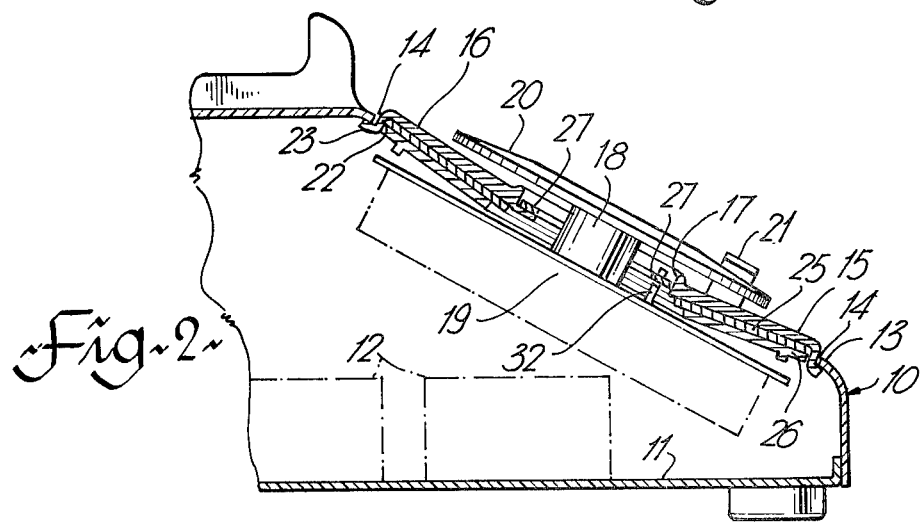
FIG. 2 is a cross-section on the line II—II of FIG. 1.

FIGS. 1 and 2 illustrate one form of conventional telephone set, as supplied for domestic use, hotels and motels and offices. It comprises a top housing 10, secured to a base 11, the various components 12 usually mounted on the base. In the front face 13 is formed a large aperture 14 and a disc-like member 15 fits into this aperture. Normally this member 15 is of opaque plastic and has formed on its outer surface 16, by printing or other means, numbers and/or letters or other data. The member 15 has a central aperture 17 through which passes a rotary member 18 of the dial mechanism indicated in dotted outline 19. A dial 20 is attached to the forward end of the rotary member 18. A finger stop 21 extends through the member 15.

The disc-like member 15 has a rearwardly extending rim 22 and a radially extending flange 23 at the rear edge of the rim 22. Rim 22 is a fairly close fit in the aperture 14 and flange 15 extends beneath the front face 13 of the top housing 10. Rim 22 and flange 23 assist in preventing entrance of foreign matter into the interior of the telephone set.

Figure 3:
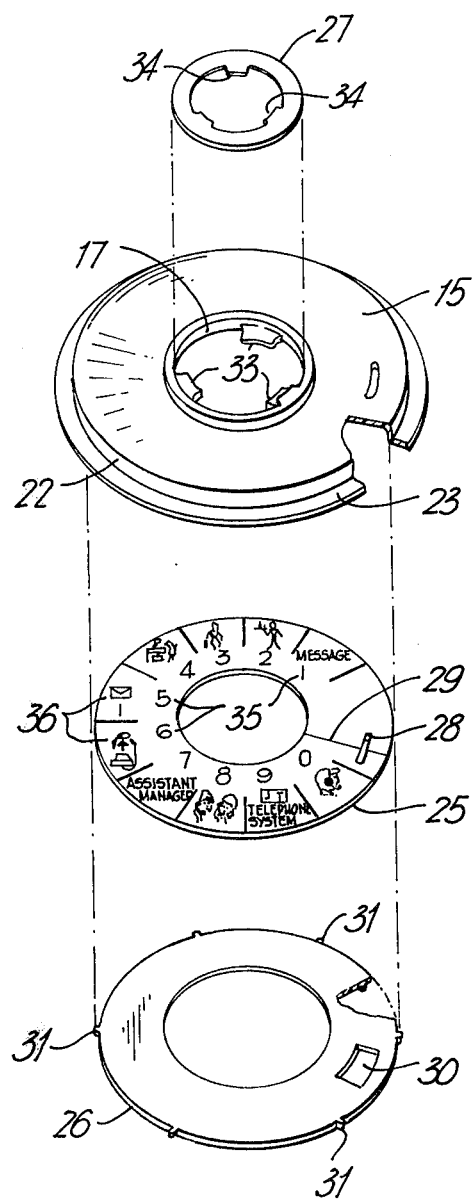
FIG. 3 is an exploded perspective view of the various items in relation to the dial and disc-like member.

In conventional telephone sets, as previously stated, the member 15 would be of opaque material, with numerals, letters or other forms of information or script either formed as by transfer moulding, printed on, or by sticking on of an annular member. In FIG. 2, the present invention is involved. The member 15 is of transparent material, behind which is positioned an annular insert 25 and behind insert 25 is a substantially rigid backing member 26. These members are illustrated in the exploded perspective view of FIG. 3. At the top of FIG. 3 is the disc-like member 15, at centre is the annular insert 25 and at bottom the backing member 26. Also shown is a retaining ring 27, of conventional form.

The insert 25, as an example of thin card, has a slot 28 cut out for the finger stop 21 to pass through. The insert has a radial cut 29 across at the slot 28 for fitting round the finger stop. The backing member 26 has a fairly large aperture 30 which enables the backing member to be fed over the finger stop 21. The backing member, which is conveniently of moulded plastic, has a plurality of small radial projections 31 spaced around its periphery. These projections provide a friction fit of the backing member inside the rim 22 of the member 15.

The member 15 is attached to the top plate 31 of the dial mechanism 19 by means of the retaining ring 27. A number of small brackets or projections 32 are bent upwards out of the plate 31. Generally three equally spaced brackets are provided and each has a slot in one side. The member 15, with the insert 25 and backing member 26 assembled thereto, is positioned on the plate 31, radial projections 33 on the member extending radially in between the brackets 32. Retaining ring 27 is then placed on the radial projections 33, and rotated. Radial extensions 34 on the ring 27 engage in the slots in the brackets 32. This is a conventional way of assembling the member 15 to the dial mechanism. The dial 20 is then attached to the rotary member 18 of the dial mechanism, again in a conventional manner. The dial mechanism is attached to the base 11 by brackets, not shown. Thus when the top housing 10 is assembled to the base 11, the member 15 fits into the large aperture 14 in the top housing.

The insert 25 has indicia printed thereon. Thus, in the example, in addition to the normal telephone numerals at 35, illustrative indicia, indicative of services, can be included at 36. By change of the inserts 25 any form of numerals etc., can be provided, for example, Roman, Arabic, Jewish, et al.

What is claimed is:

1. A telephone set having a rotary dial, and including a base and a top housing extending over and attached to said base and enclosing electrical components and dial mechanism of the telephone set, said top housing having a front face and an aperture in said front face for passage of the rotary dial therethrough;

a transparent disc-like member positioned in said aperture, said disc-like member including a rim extending rearwardly at the periphery of the member and a radially extending flange at the rearward edge of the rim, and having a central aperture through which a rotary member of the dial mechanism extends;

an opaque annular insert positioned behind and in contact with the back surface of the transparent disc-like member, and indicia on the front face of the annular insert, said indicia associated with finger holes in said rotary dial; and a substantially rigid backing member positioned behind and in contact with said annular insert, said backing member a friction fit inside said rim of said disc-like member.

2. A telephone set as claimed in claim 1, said dial mechanism including a top plate, a plurality of brackets extending upward from said top plate, radial projections extending inwards in said central aperture of said disc-like member between said brackets, and a retaining ring positioned on said radial projections and interengaging with slots in said brackets to retain said disc-like member on said top plate.

* * * * *